US009998426B2

(12) United States Patent
Fischer et al.

(10) Patent No.: US 9,998,426 B2
(45) **Date of Patent: *Jun. 12, 2018**

(54) BI-DIRECTIONAL DATA SECURITY FOR CONTROL SYSTEMS

(71) Applicant: Sierra Nevada Corporation, Sparks, NV (US)

(72) Inventors: Peter Fischer, Highlands Ranch, CO (US); Joshua A. Edwards, Castle Rock, CO (US); Kyle Andrew Shepard, Highlands Ranch, CO (US); Kevin Jeffrey Streander, Castle Rock, CO (US)

(73) Assignee: SIERRA NEVADA CORPORATION, Sparks, NV (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/671,870

(22) Filed: Aug. 8, 2017

(65) Prior Publication Data

US 2017/0374027 A1 Dec. 28, 2017

Related U.S. Application Data

(63) Continuation-in-part of application No. 14/668,602, filed on Mar. 25, 2015, now Pat. No. 9,729,507, (Continued)

(51) Int. Cl.
*H04L 29/06* (2006.01)
*H04L 29/08* (2006.01)

(52) U.S. Cl.
CPC ...... *H04L 63/0218* (2013.01); *H04L 63/0263* (2013.01); *H04L 69/22* (2013.01); (Continued)

(58) Field of Classification Search
CPC ............................ H04L 63/02; H04L 63/1408
See application file for complete search history.

(56) References Cited

U.S. PATENT DOCUMENTS 4,019,174 A 4/1977 Vanderpool et al.
5,157,769 A 10/1992 Eppley et al.
(Continued)

FOREIGN PATENT DOCUMENTS

EP 2175603 4/2010

OTHER PUBLICATIONS

International Search Report and Written Opinion on corresponding PCT application (PCT/US2015/011249) from International Searching Authority (KIPO) dated Apr. 22, 2015.
(Continued)

*Primary Examiner* — John B King
(74) *Attorney, Agent, or Firm* — Klein, O'Neill & Singh, LLP

(57) ABSTRACT

A cyber-security device includes a processor operable to process messages with a data validation rule-set; an external communication interface configured for bi-directional data communication between the processor and external networks or systems; and an internal communication interface configured for bi-directional data communication between the processor and a safety-critical control device, wherein the data received by the processor via either the external or internal communication interface is blocked, sanitized, or passed by the appropriate rule-set, depending on whether the data conform to validation criteria established by the rule-set. The processor analyzes the data, preferably byte-by-byte, with the data in each byte being required to conform to the rule-set validation criteria before being passed from the processor to the appropriate interface.

59 Claims, 8 Drawing Sheets

Related U.S. Application Data which is a continuation-in-part of application No. 14/168,283, filed on Jan. 30, 2014, now Pat. No. 9,531,669.

(52) U.S. Cl.
CPC ......................... *G05B 2219/32404* (2013.01); *H04L 63/1408* (2013.01); *H04L 67/02* (2013.01)

(56) References Cited

U.S. PATENT DOCUMENTS

| | | | |
|---|---|---|---|
| 5,327,546 | A | 7/1994 | Yokoi et al. |
| 6,502,003 | B1 | 12/2002 | Jacobs et al. |
| 7,356,736 | B2 | 4/2008 | Natvig |
| 7,649,452 | B2 | 1/2010 | Zilberstein et al. |
| 8,041,874 | B2 | 10/2011 | Sisto et al. |
| 8,069,372 | B2 | 11/2011 | Natvig |
| 8,572,717 | B2 | 10/2013 | Narayanaswamy |
| 8,578,362 | B2 | 11/2013 | Brescia |
| 8,595,831 | B2 | 11/2013 | Skare |
| 8,856,508 | B2 | 10/2014 | Genissel |
| 2003/0005331 | A1 | 1/2003 | Williams |
| 2003/0093519 | A1 | 5/2003 | Jackson et al. |
| 2010/0036992 | A1 | 2/2010 | Sisto et al. |
| 2010/0095367 | A1 | 4/2010 | Narayanaswamy |
| 2010/0165878 | A1 | 7/2010 | Soni |
| 2010/0277270 | A1 | 11/2010 | Aikens et al. |
| 2010/0287603 | A1 | 11/2010 | Alexander et al. |
| 2011/0039237 | A1 | 2/2011 | Skare |
| 2011/0249816 | A1 | 10/2011 | Choi et al. |
| 2012/0144187 | A1 | 6/2012 | Wei et al. |
| 2012/0151558 | A1 | 6/2012 | Byres et al. |
| 2012/0198541 | A1 | 8/2012 | Reeves |
| 2015/0135254 | A1 | 5/2015 | Thilenius et al. |
| 2017/0054752 | A1 | 2/2017 | Nguyen et al. |

OTHER PUBLICATIONS

Non-Final Office Action on co-pending U.S. Appl. No. 14/168,283 dated Mar. 10, 2016.

Non-Final Office Action on co-pending U.S. Appl. No. 14/668,602 dated Apr. 22, 2016.

International Search Report on corresponding PCT application (PCT/US2016/023225) from International Searching Authority (USPTO) dated Jun. 6, 2016.

Written Opinion on corresponding PCT application (PCT/US2016/023225) from International Searching Authority (USPTO) dated Jun. 6, 2016.

Notice of Allowance on co-pending U.S. Appl. No. 14/168,283 dated Oct. 7, 2016.

Final Office Action on co-pending U.S. Appl. No. 14/668,602 dated Nov. 4, 2016.

Notice of Allowance on co-pending U.S. Appl. No. 14/668,602 dated Apr. 12, 2017.

Extended Search Report from European Patent Office on co-pending EP application (EP15742692.5) dated May 22, 2017.

BI-DIRECTIONAL DATA SECURITY FOR CONTROL SYSTEMS

CROSS-REFERENCE TO RELATED APPLICATIONS

The present application is a continuation-in-part of co-pending U.S. patent application Ser. No. 14/668,602, filed Mar. 25, 2015, titled BI-DIRECTIONAL DATA SECURITY FOR SUPERVISOR CONTROL AND DATA ACQUISITION NETWORKS, which is a continuation-in-part of U.S. patent application Ser. No. 14/168,283, filed Jan. 30, 2014, titled BI-DIRECTIONAL DATA SECURITY FOR SUPERVISOR CONTROL AND DATA ACQUISITION NETWORKS. The disclosures of the referenced applications are hereby incorporated by reference as if set forth in full herein.

FEDERALLY SPONSORED RESEARCH OR DEVELOPMENT

Not Applicable.

BACKGROUND

This disclosure relates generally to the field of cybersecurity for control systems. More specifically, in some aspects, it relates to devices and methods for providing secure communications to and from one or more safety-critical control systems, such as those found on aircraft avionics, nuclear power plants, rail systems, ships, and automobiles, and applies to both manned and autonomous vehicles and systems. As an example, avionics control systems may be designed to be isolated, critical networks, but some avionics technologies, such as ADS-B and ACARS, support external communication messages, and have become increasingly important in aircraft operations. These latter technologies demonstrate a need for protecting critical systems from spurious, erroneous, or malicious signals, while still enabling external communications for aircraft operations. To provide adequate protection for these systems against, for example, cyber-terrorism and malicious attacks, a solution must be capable of both interfacing with, and routing data between, a multitude of communication media and protocols, including deterministic/real-time buses as well as non-deterministic and network interfaces, such as, for example, Ethernet, fiber-optics, CANBUS, ARINC-429, ARINC-664, RS-232/422/485, and MIL-STD 1553B. Additionally and advantageously, the solution can take into account the state of physical switches and relays, and digital and analog electrical inputs.

Current state of the art solutions for interfacing between safety-critical control systems, such as avionics, use a uni-directional "data-diode," which is a device designed to provide only a one-way flow of information. This is mostly used to send messages and status data from the protected or safety-critical systems, such as avionics, to other systems. For example, a data-diode can be used for aircraft flight status information on commercial airline flights, providing customers details of the flight on a moving map application that shows where the aircraft is located, along with altitude, speed and time of arrival. In many instances, however, interfaces need to be implemented as bi-directional and therefore require a more sophisticated device that can enable a safe solution for messaging, remote command and control, or other applications required on systems such as a modern aircraft, power plant, transport vehicle, or unmanned system. Increasingly these systems are being operated for uses beyond their original intent, and in many cases they include specific equipment that must be controlled remotely or through networks or interfaces that require bi-directional communication. Further, a solution is needed that can validate and provide cyber security for machine-to-machine (M2M) communications and control messages between two safety-critical devices in a control system without interrupting critical timing on deterministic systems or buses or introducing system instability due to latency of processing the messages.

Accordingly, a solution has been sought to the problem of ensuring bi-directional cyber-security for safety-critical systems by protecting these critical control devices from both internal and external attacks and threats. "Bi-directional" is understood to encompass both incoming data (data coming into the critical control system or device from an interface, internal or external, with which the system or device is linked), and outgoing data (data communicated from the control system or device to the linked interface).

SUMMARY

Broadly, in accordance with at least some embodiments of this disclosure, a bi-directional cyber-security device for safety-critical control systems will ideally support processing messages inline between many different interfaces and communications protocols, including deterministic (real-time) and non-deterministic and network messages. Cyber-security devices in accordance with embodiments of this disclosure will thereby provide a solution that can perform a secure "bridge" or "gateway" between different systems, as well as internal and external interfaces and networks. For example, this would enable a system on an Ethernet network to communicate with control systems over interfaces such as ARINC-429, ARINC-664, MIL-STD 1553B, RS-232/422/485 or CANBUS, and to include the incorporation of message translation and interoperability between these different types of networks with byte-by-byte validation of each message, and operational state-based rule sets to provide cyber security for all communications. This provides the efficiency of allowing disparate systems to interoperate and communicate in a simple and effective manner, along with security to ensure that communications can be done safely.

Bi-directional cyber-security devices in accordance with embodiments of this disclosure may advantageously provide protection across all seven OSI model layers by creating an isolation barrier between each safety-critical control device and the networks or interfaces to which they are connected. Alternatively, such cyber-security devices may operate in a fashion that does not encompass all 7 OSI layers, similar to a router or network switch, or at the application level as part of a process, but in all cases they operate with a customizable rule-set programmed into the device for processing inbound and outbound data (commands and messages) at each interface. A cyber-security device according to these embodiments is configured to pass only validated data, and to "sanitize" and/or block data that do not conform to validation criteria established by the rule-set. "Sanitizing" can consist of replacing malicious or malformed data with default values or "last known good" data, depending on user preferences and operational conditions. The rule-set can be customized for each control device and the interfaces it supports, and it can also take into account the entire control system, its operating parameters, and its defined safety limits. Advantageously, in an aspect, separate rule-sets are provided to define how inbound and outbound data are processed, sanitized, blocked, or validated on a per interface basis.

More specifically, a cyber-security device in accordance with embodiments of this disclosure comprises a processor operable to process messages with a data validation rule-set (preferably, but not necessarily, separate data validation rule-sets for inbound and outbound data customized per interface and system); external communication interface(s) configured for bi-directional data communication between the processor and external networks or systems; and internal communication interface(s) configured for bi-directional data communication between the processor and at least one safety-critical control device, wherein the data received by the processor via either the external or internal communication interface is either deleted/blocked, sanitized, or passed by the appropriate rule-set, depending on whether the data conform to validation criteria established by the rule-set. The processor analyzes the data, preferably byte-by-byte, with the data in each byte being required to conform to the rule-set validation criteria before being passed from the processor to the appropriate outgoing interface, with the cyber security device acting as a bridge or data router between internal and external communication interfaces. The processor may also be configured to be re-programmed with new rule-sets, for example during start-up ("re-booting"), but preferably programmatically via a remote or local communications interface. Additionally, the device may be configured in a "learning" mode of operation, in which bi-directional message traffic will be analyzed and a ruleset automatically created and/or updated based on the analyzed message traffic.

In accordance with another aspect of the disclosure, a method of validating data transmitted between a first or internal interface that includes a control device, particularly a safety-critical control device, and second or external interface comprises, in at least some embodiments, (a) providing a processor programmed with a rule-set establishing data validation criteria between the interfaces; (b) communicating data to the processor from one of the interfaces; (c) operating the processor to determine if the data conform to the data validation criteria established by the rule-set; and (d) communicating the data from the processor to the other of the interfaces only if the data conform to the validation criteria.

As will be better appreciated from the detailed description below, a cyber-security device in accordance with the present disclosure provides for inline processing between many different interfaces and communications protocols, thus providing a solution that can perform a secure "bridge" or "gateway" between different systems. For example, this feature would enable a system on an Ethernet network to communicate with control systems over both deterministic (real-time) and non-deterministic interfaces such as ARINC-429, ARINC-664, MIL-STD-1553B, RS-232/422/485, and CANBUS, including incorporation of message translation and interoperability between these different types of interfaces with byte-by-byte validation of each message, and operational state-based rule sets to provide cyber security for all communications. This provides both the efficiency of allowing disparate systems to interoperate and communicate in a simple and effective manner, along with a high degree of security.

It will further be appreciated that the subject matter of this disclosure provides security for protocols and messages that are low-level, deterministic (real-time) communications, in additional to Ethernet and IP networks. Furthermore, the cyber-security innovation disclosed herein may accommodate a broad range of safety-critical protocols, and is therefore able to provide continuous communications for deterministic and safety-critical communication protocols that cannot tolerate "blocked" or "dropped" messages. This is accomplished through state-based processing and the ability to filter, redact, or replace fields in a message, and allowing validated ("safe") content to pass, instead of dropping or blocking the entire message.

Because the cyber security device acts as a gateway and has inputs from a large number of data sources all related to a complex system, the cyber security device must be able to process and a system state "globally" or across the entire system, taking into account system state information from all sources and interfaces for use in processing and validating data through state-based rulesets. Functionally, this means that a system state may be maintained for a critical field on an interface where no state-based ruleset is present, and likewise system state data from a separate interface can be used for processing in state-based rulesets for a separate interface. In this manner the cyber-security device can also compare similar or redundant data sources in building the overall system state.

A method and a device in accordance with this disclosure will be understood to have the capability of interfacing with safety-critical data systems and buses, IP networks, or other required interfaces in a distributed control system, while being flexible enough to support a wide range of current and future applications. It will be apparent that, because cyber-security devices in an accordance with this disclosure are advantageously capable of handling most, if not all, required combinations of deterministic and non-deterministic or network interfaces, they can be fielded in a wide range of architectures in a control system, or even inside a control device. The cyber-security devices disclosed herein can be placed near a safety-critical system (e.g., manned or unmanned aircraft avionics) without being embedded inside the safety-critical system, thereby providing security without requiring expensive and time-consuming certification every time an update to the security system is performed. If required, the cyber-security device can be embedded in a system-critical bus or sub-system to protect data and signals between safety-critical systems, and/or the system, bus, or sub-system whereas in this application, the cyber-security device would be required to be part of a safety-critical certification, where the system handles both safety-critical and non-safety-critical messaging as a part of the overall certified safety critical system.

Because a cyber-security device in accordance with this disclosure validates every byte of message traffic bi-directionally, while advantageously providing protection that encompasses all 7 OSI layers, the device can be fielded to provide boundary security between different security or certification domains (commonly referred to as a cross-domain solution), thus accounting for protection of safety-critical data, as well as security and message integrity as related to security classification levels, for national defense, security, and intelligence operations.

An exemplary application for the subject matter disclosed herein is for blocking malicious commands over maintenance or remote monitoring interfaces on aircraft, particularly commercial aircraft. Modern aircraft have remote monitoring and maintenance interfaces used for system diagnostics, such as engine performance. Some of these interfaces are designed as command and control interfaces, and they enable operations for system testing in addition to monitoring. By placing the cyber security device as a secure avionics "gateway" between the critical systems and these diagnostic networks, and connecting the gateway to the avionics buses for state information, rulesets can be created, such as the following: "If the aircraft is airborne, block all diagnostic or test commands/functions, and only allow reading system status." This enables the same networks to be securely used for ground maintenance as well as airborne monitoring, but it prevents malicious and potentially catastrophic commands from being issued while in flight.

DETAILED DESCRIPTION

Figure 1:
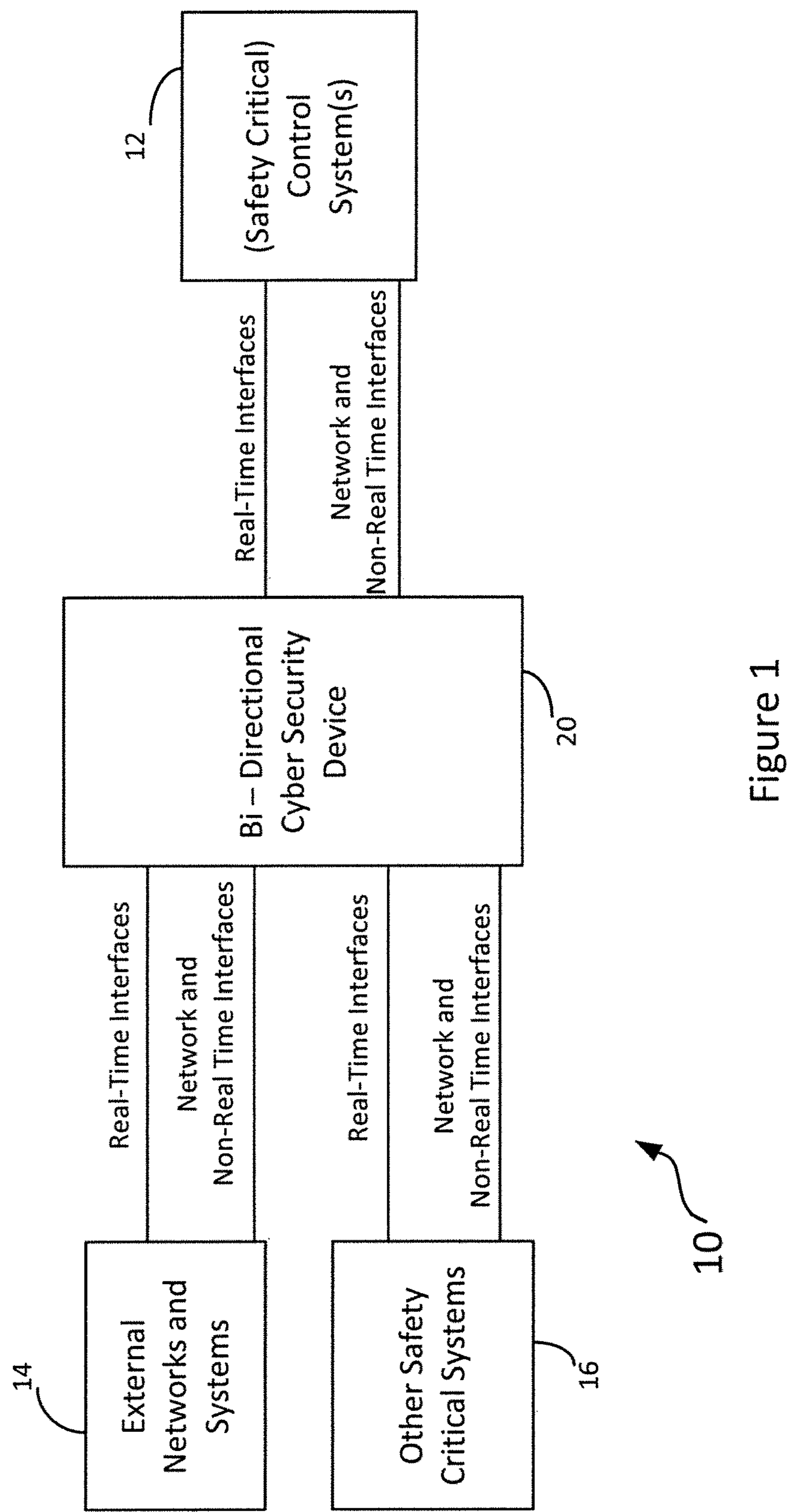
FIG. 1 is a simplified semi-schematic representation of external networks and systems as well as other control systems connected to a safety-critical control system including a cyber-security device according to the present disclosure.

The following detailed description describes the present aspects with reference to the drawings. In the drawings, reference numbers label elements of the present aspects. These reference numbers are reproduced below in connection with the discussion of the corresponding drawing features.

It will be understood that any of the aspects described with reference to the figures may be implemented using software, firmware, hardware (e.g., fixed logic circuitry), or a combination of these implementations. The terms "logic," "module," "component," "system," and "functionality," as used herein, generally represent software, firmware, hardware, or a combination of these elements. For instance, in the case of a software implementation, the terms "logic," "module," "component," "layer," "system," and "functionality" represent executable instructions that perform specified tasks when executed on a hardware-based processing device or devices, such as, for example, a CPU, a programmable logic device, a field-programmable gate array (FPGA), and/or an application-specific integrated circuit (ASIC). The program code can be stored in one or more non-transitory, computer-readable or system-readable memory devices, or it may be executable as an integrated part of programmed logic or a custom circuit.

More generally, the illustrated separation of logic, modules, components, systems, and functionality into distinct units may reflect an actual physical grouping and allocation of software, firmware, and/or hardware, or it can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations. The term "machine-readable media" and the like refers to any kind of medium for retaining information in any form, including various kinds of storage devices (magnetic, optical, solid state drive (SSD), flash memory, etc.).

The aspects disclosed herein may be implemented as a computer process (method), a computing system, or as an article of manufacture, such as a computer program product or computer-readable media. The computer program product may be embodied or implemented as non-transitory, computer storage media, readable by a computer device, and encoding a computer program of instructions for executing a computer process. The computer program product may also be readable by a computing system, and encoding a computer program of instructions for executing a computer process.

FIG. 1 shows a safety-critical control system 10 that includes one or more control devices 12, one or more of which may be a safety-critical control device. Each safety-critical control device 12 is linked to one or more external networks, systems, or interfaces 14 and/or other safety-critical systems or interfaces 16 (hereinafter collectively referred to as "secondary systems") via either a deterministic (time-critical or real-time) or non-deterministic (non-time-critical or non-real-time) network, medium, or protocol or a combination of these communication interfaces. Interposed between, and operatively linking, the secondary systems 14, 16 and the control device(s) 12 is at least one cyber-security device 20, in accordance with this disclosure. The cyber-security device 20, which will be described in detail below, is installed between the secondary systems and the control device(s) 12, whereby all data communicated to or from each control device 12 passes through, and is processed by, a cyber-security device 20, as will be described below. In some embodiments (depending on system architecture), a single cyber-security device 20 may be operationally associated with each control device 12, but other configurations (e.g., multiple control devices connected to an external network, or multiple control devices connected to each other) may be suitable, depending on the particular application. Thus, a system may be configured, for example, with one cyber-security device 20 operationally associated with two or more control devices 12. In an aspect, the cyber-security devices are transparent to the system and would not impact the system's normal operation.

In an aspect, a cyber-security device 20 includes a programmable rule-set that provides one or more rules for handling messages that are sent through it. In an aspect, a rule-set comprises configuration settings loaded into a specific location in memory or device storage, through either a file or a programming interface (internal or external). Alternatively, and advantageously, a cyber-security device can be fielded to automatically build a rule-set when operated in a "learning mode" through processing all traffic in the system and using message analysis, heuristics, and/or other algorithms, such as machine learning. Accordingly, the rule-set can be customized for each control device 12 and the overall control system with which the cyber-security device 20 is associated. A rule-set may include static rules, such as “allow” or “deny” based on the message protocol, content, interface, or destination. A rule-set may also include dynamic rules that use variables that can be assigned to message data fields, registers, system time, or other operational parameters. In this manner, large numbers of “static rules” may be condensed into smaller rule-sets. For example, a dynamic rule may allow messages over a range of message data addresses or command sequences only during certain times of day, and another range of message data addresses or command sequences during a different time of day. The cyber-security device 20 may be configured, in an aspect, to allow only limited changes to its configuration, such as the rule-set and network settings. In an aspect, all other data locations may be restricted from change to provide more security to the operation of the cyber-security device.

Figure 2:
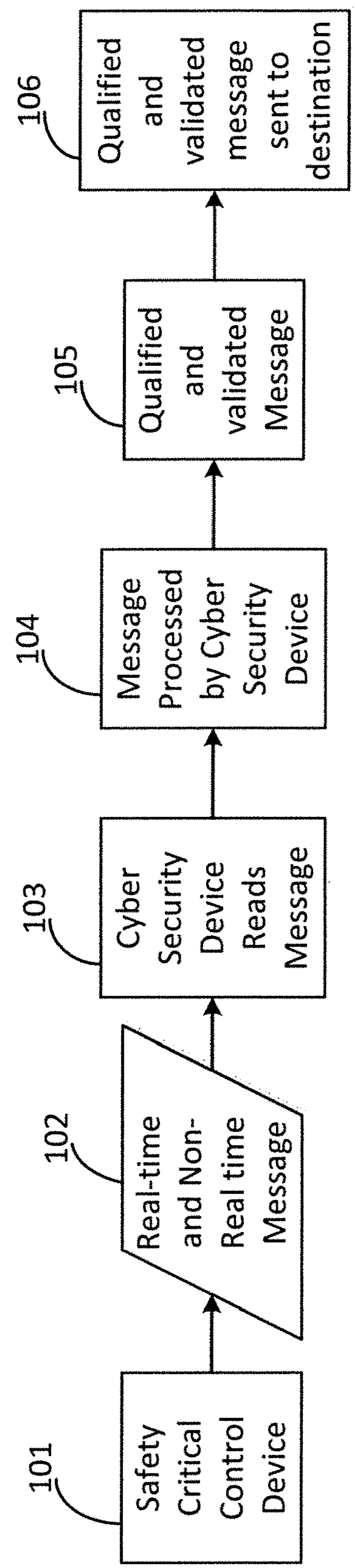
FIG. 2 is a generalized, high-level flow chart representing the outbound flow of data from a safety-critical control device, wherein the data are validated by a cyber-security device in accordance with an aspect of this disclosure.
Figure 3:
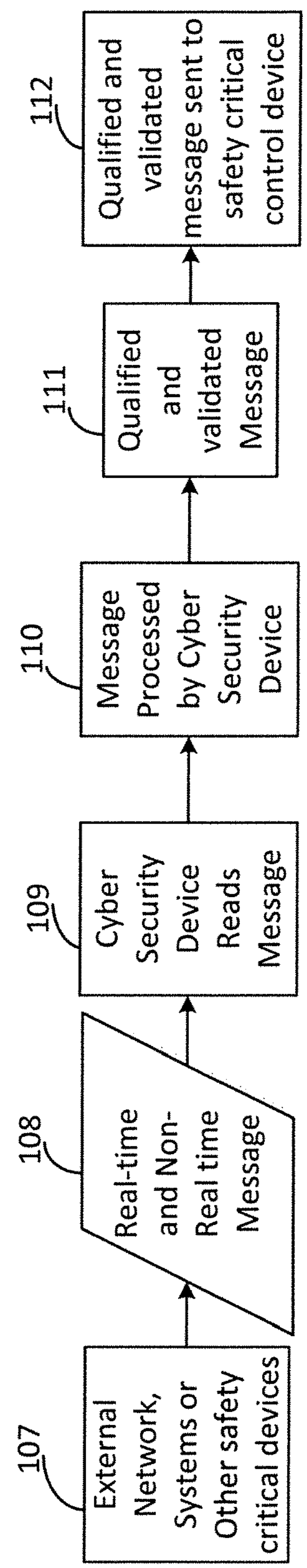
FIG. 3 is a generalized, high-level flow chart representing an inbound flow of data to a safety-critical control device, wherein the data are validated by a cyber-security device in accordance with an aspect of this disclosure.

FIGS. 2 and 3 show generally the flow of data into and out of a cyber-security device 20. In FIG. 2, outbound data (information and/or messages) to a secondary system are generated (step 101) by a control device 12. The outbound data may represent status information and/or messages 102 acquired by the control device 12, or it may include commands to control secondary safety-critical and/or standard control systems on any connected interface. Additionally, the outbound data may represent or include the same or similar data types from external sources and/or systems, including secondary safety-critical systems. The data from the control device 12 are received by the cyber-security device 20 (step 103) through a communication interface, which can either be in real-time (deterministic) or other than real-time (non-deterministic). The data are then processed (step 104) by the cyber-security device 20, first to screen out any data deemed invalid or malformed (“unqualified” data) based on a rule-set in accordance with a predefined protocol that is established by a schema, rule-set, or other configuration in the cyber-security device 20, or advantageously generated automatically if the cyber-security device is operating in a learning mode. Any unqualified data are blocked or deleted (dropped), and a corresponding event log entry may advantageously be created and/or output over a logging interface (not shown). Well-formed (“qualified”) data are then validated against the rule-set established by the security software to assure compliance with the data validation criteria established by the rule-set. For non-deterministic messages, any data that are not in compliance with the validation criteria are deleted or blocked, and an event log entry may advantageously be created and/or output. For deterministic or real-time messages, data that are not in compliance with the validation criteria are replaced or removed, so that the message is sanitized and safe for transmission to or from the safety-critical control device. In this manner, the cyber security device ensures that, for all communication interfaces, only data that are validated by compliance with the validation criteria are passed (step 105) to a protected secondary communication interface and then to a recipient system or device (step 106).

The processing of step 104 may also serve another purpose with respect to messages sent from a safety-critical control device. Because the cyber-security device 20 processes every byte of data in a message, it can “understand” and store the state of the control device that sent the message. In general, in some aspects, a safety-critical control device, and the overall control system in which it is fielded, may operate as a state machine, meaning that it must be in one of a finite number of conditions or states at any given time. In such a system, the control device operates under a particular set of rules allowed in that current state until conditions cause the control device to transition to a new state. In that new state, a different set of rules may apply. As such, in an aspect, the cyber-security device may use data from within the control device messages and the overall state of the control system to use that in the validation of messages, such as commands, accordingly.

For example, certain messages may communicate the values of state status (e.g., temperature or pressure) associated with the control device or the control system, or additional digital or analog relays or other inputs may communicate critical states (e.g. aircraft weight on wheels in an exemplary avionics system). When these states are deemed important to overall control system safety, the cyber-security device 20 may maintain these state-indicative values in memory, such as a variable data field in an executable command or program, and update a copy of each such value for use in processing and validating messages over any interface in the system. These state variables may be stored in registers, volatile and/or non-volatile memory, or the like. In one aspect, it is preferred that any state variable data be updated only after the message is qualified and validated. In other aspects, however, state variable data may be processed simultaneously with other processing or in another order. In an aspect, therefore, the state-based rule-sets operate at the OSI layer 7 (application layer) by looking at the value of variables indicating the device or system state. Other OSI layer states, such as session and transport, can also be considered to provide further information on the source of the data.

As will be described in more detail below, the cyber-security device 20 may seek to store this state data in order to factor in the state of the control device 12 when processing and validating messages, as some messages may be allowed or denied only in specific situations. Additionally, the cyber-security device may use this state data either in real time or though building historical data models to refine its learning mode of operation so as to build and refine rule-sets autonomously Updating the state variables based on processing conforming messages allows the cyber-security device 20 to remain transparent in the sending and receiving of messages. Typically in such systems, the control device 12 is being polled by an external system or another device at regular intervals during normal operation, whereby the cyber-security device 20 is likely to have relatively accurate state information simply from reading the contents of the responses of the control device 12. In another aspect, the cyber-security device 20 may poll a control device 12 or one or more other connected devices to maintain or refresh required system state variables by generating its own data request messages. In some cases, this is a less desirable—but still functional—method of operation.

In FIG. 3, the secondary system, interface, or device (step 107) generates inbound data 108 that are received by a cyber-security device 20 (step 109) via a communication interface and then processed (step 110), as described above with reference to step 104 in FIG. 2. Only data that are validated by compliance with the validation criteria are passed (step 111) to a protected secondary communication interface (described below) and then to the designated control device 12 (step 112). While the state of one or more control devices 12 is more likely to be of importance in processing messages through a cyber-security device 20 than the state of a secondary control device or system, state variable data information may also be processed from messages directed to a control device 12 in a manner as described above with respect to FIG. 2.

Figure 4:
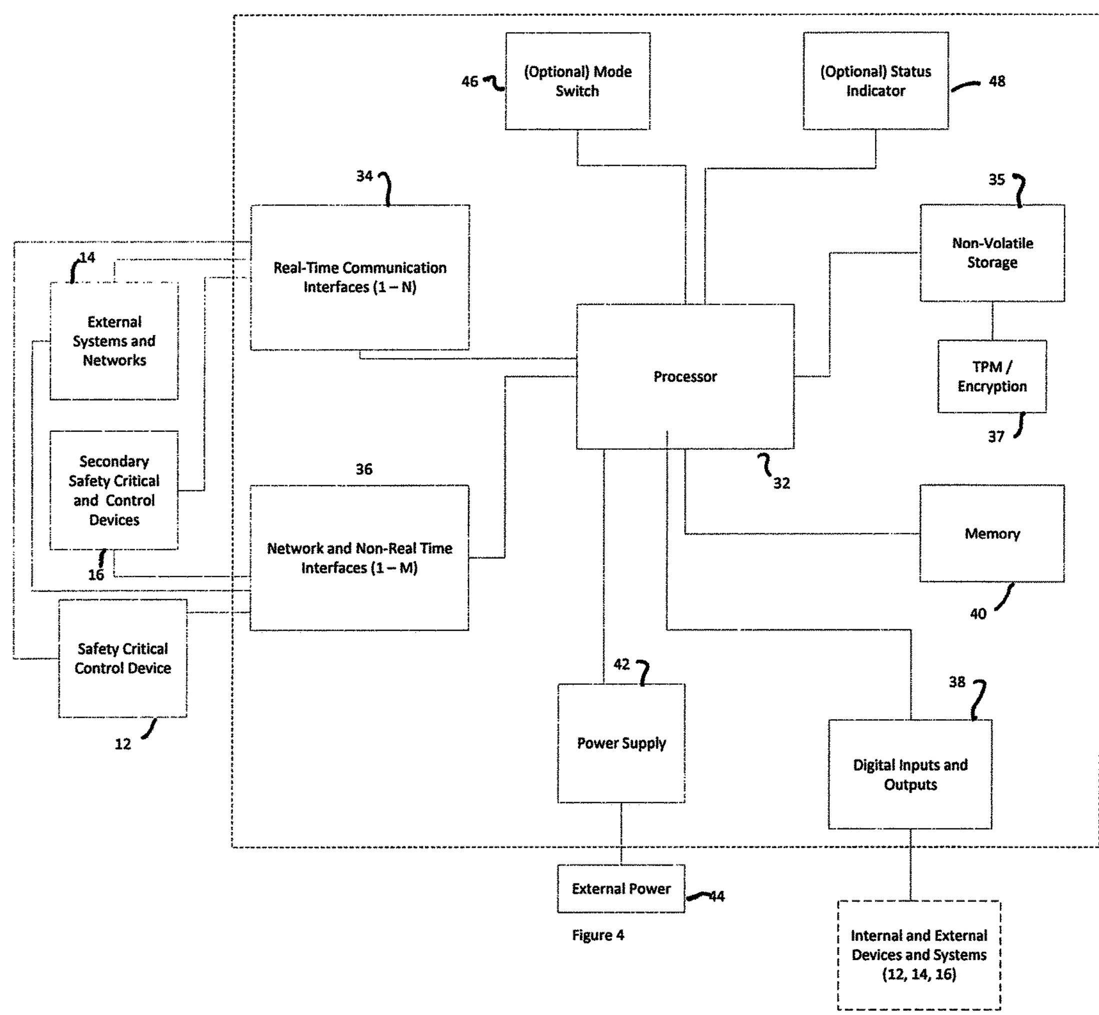
FIG. 4 is a diagrammatic representation of an embodiment of a cyber-security device in accordance with the present disclosure.

FIG. 4 schematically illustrates an instantiation of the cyber-security device 20 as installed in a safety-critical control system. In an aspect, as illustrated, the device 20 includes at least one processor 32 that communicates with an external system 14 and/or a secondary safety-critical control device 16 by means of one or more real-time (deterministic) communication interfaces 34 and one or more network and non-real time (non-deterministic) communication interfaces 36, and with a safety-critical control device 12 by means of the same communication interface(s) 34 and 36. The communication interfaces 34, 36 may employ Ethernet (which includes 100 Base-T and/or Gigabit Ethernet) or fiber (for example) as a non-deterministic communication protocol, or they may use any of several deterministic communication protocols, such as, for example, ARINC-429, CAN-BUS, and MILSTD-1553B. In an aspect, the processor 32 may be understood as including memory 33 and non-volatile storage 35 with which a processor module communicates. For example, either or both of the memory 33 and the non-volatile storage 35 may optionally be included with the processor 32 in a microcomputer, ASIC, or FPGA, as is well known, or they may be separate components. The non-volatile storage 35 may include a TPM/Encryption module or functionality 37. In an aspect, power is provided by a DC power supply 42, connectable to any suitable external power source 44, that converts the voltage from the source 44 to a voltage suitable for operating the electronic components of the cyber-security device 20.

The one or more processors 32, also known as central processing units (CPUs), may be, or may include, one or more programmable general-purpose or special-purpose microprocessors, digital signal processors (DSPs), programmable controllers, application specific integrated circuits (ASICs), programmable logic devices (PLDs), FPGAs, or the like, or a combination of such hardware devices. In an aspect, the processor 32, non-volatile storage 35 and/or memory 33 may be combined in a system-on-a-chip (SoC) configuration, such as those commercially available based on ARM or x86 designs. In other aspects, memory 33 and/or storage 35 may be separate components.

Each of the processors 32 executes machine-implemented instructions (or process steps/blocks) out of memory 33. In an aspect, processor 32 communicates with the other components through one or more interconnects (unlabeled) that may be referred to as a computer bus or set of computer buses, as is well-known. A computer bus may be, for example, a system bus, a Peripheral Component Interconnect (PCI) bus, a PCI-Express (PCIe) bus, a HyperTransport or industry standard architecture (ISA) bus, a SCSI bus, a universal serial bus (USB), an Institute of Electrical and Electronics Engineers (IEEE) standard 1394 bus (sometimes referred to as “Firewire”), or any other type of bus. It is preferable that each processor 32 sits between separate buses to connect to external and internal communication interfaces 34, 36, such that the processor 32 cannot be bypassed by any direct path between the secondary system/devices 14, 16 and the control device 12.

The storage device 35, which may be or include, for example, a hard disk (HDD), a CD-ROM, a non-volatile memory device such as flash, a hybrid drive (sometimes referred to as SSHD), or any other storage device for storing persistent, structured or unstructured data. Storage 35 may store operating system program files (or data containers), application program files, and one or more rule-sets in the form of scripts, functions, programs, configuration files or other file types. In an aspect, storage 35 may also include a data file or data structure that maintains indications of device states as described herein.

Memory 33 also interfaces with the processor(s) 32 with access to memory storage. Memory 33 may include any suitable type of random access main memory (RAM) for example. When executing stored computer-executable process steps from storage 35, the processor(s) 32 may store and execute the process steps out of memory 33. Read only memory (ROM, not shown) may also be used to store invariant instruction sequences, such as startup instruction sequences or basic input/output system (BIOS) sequences for operation of a keyboard (not shown). In an aspect, memory 33 may include a data structure storing device state indications as described herein for use when processing messages with a state-varied rule-set, as described below.

As discussed above, each processor 32 is programmable with a rule-set that validates both inbound data that is received from the external systems via real-time communication interfaces 34 or non-real time interfaces 36, and outbound data that is received from protected communication interfaces included in the interfaces 34 and 36. In an aspect, as mentioned above, inbound and outbound data are processed by their respective rule-sets that may be simultaneously or separately programmed into the processor(s) 32. Programming and re-programming are accomplished via the appropriate communication protocol through at least one of the external interfaces 34, 36 when the cyber-security device 20 is in a programming mode initiated by the activation of a mode switch 46. In another aspect, programming and reprogramming are accomplished via one of the communication interfaces 34, 36 when an approved action enables reprogramming, such as activation of a programming mode, or a validated user identification received via one of the external communication interfaces 34, 36. In a preferred embodiment, the mode switch 46 may be a physical (i.e., hardware) switch that can be actuated manually. For example, the mode switch 46 may comprise a button, lever, plunger, blade, or the like that can be accessed by a tool (not shown) inserted through an aperture in the housing (not shown) containing the electronic components. In other aspects, the mode switch 46 may include a fingerprint scanner or other biometric security device. Thus, any alteration, whether benign or malicious, of the operational software of the cyber-security device 20 preferably requires physical access to the cyber-security device 20. Alternatively, the mode switch 46 may be a logical switch activated through a remote or local communication interface. In still another aspect, the device can be operated in a learning mode and thus fielded to automatically build and modify a rule-set through processing all traffic in the system, and using message analysis, heuristics, and other algorithms, such as machine learning. In the learning mode, the system can be updated continuously and automatically without the need for the programming mode or any external interface, or it can be combined with other modes of operation and authentication, if required. Furthermore, learning mode can be implemented completely in non-volatile memory and with no permanent record so that the security device can be fielded so that that it will not store any critical or secure information about the system it is protecting.

Initiation of the programming mode allows the processor(s) 32 to upload a digitally-signed rule-set received through a remote or local interface. In an aspect, digital authentication may occur through the use of public and private keys. For example, when a cyber-security device is built or set up initially, the process may include burning in a public key. Preferably this key is located in ROM or other memory that cannot be overwritten. In an aspect, updating a rule-set then may require both knowledge of an associated private key to complement the public key and physical access to the cyber-security device 20 and its programming switch 46. If a rule-set is uploaded without the correct private key signature, the device 20 may generate an error, abort the upload process, delete the attempted rule-set upload, and/or the like.

After uploading the rule-set file, in an aspect, the cyber-security device 20 is allowed to go through a complete power cycle to enter its operational mode as programmed with the new rule-set. In another aspect, the cyber-security device 20 can validate and apply the new rule-set without rebooting the processor 32, to minimize any impacts on operations. An optional status indicator 48 (preferably a visual indicator such as an LED) may optionally be employed to indicate whether the device 20 is in the programming mode or the operational mode.

As can be seen from FIG. 4, preferably the real-time communication interface(s) 34 and the non-real time or network communication interface(s) 36 are physically and electrically isolated from each other, and can communicate with each other only through the processor(s) 32. This assures that data cannot pass to or from the control device(s) 12 without being validated by the rule-set(s) programmed into the processor(s) 32, thereby providing data security that encompasses all seven OSI model layers (physical, data link, network, transport, session, presentation, and application). In some applications, however, where it may be advantageous to operate as a router or the like, the cyber security device can be implemented with only a subset of OSI model layers, for example without physical or electrical isolation, or as a complement to an existing system or architecture that requires only specific layers to be protected.

The functional components of the cyber-security device 20, as described above, are housed in an enclosure (not shown) that is advantageously made of a suitable metal alloy, such as, for example, aircraft grade 6061-T6 aluminum alloy. The above-described electronic components can be advantageously potted or otherwise physically or electronically protected to provide a certain level of anti-tamper protection. In other instances, the above-described functional components can be combined with other systems or components to create a cyber security solution that is combined with a control system or other system.

Figure 5:
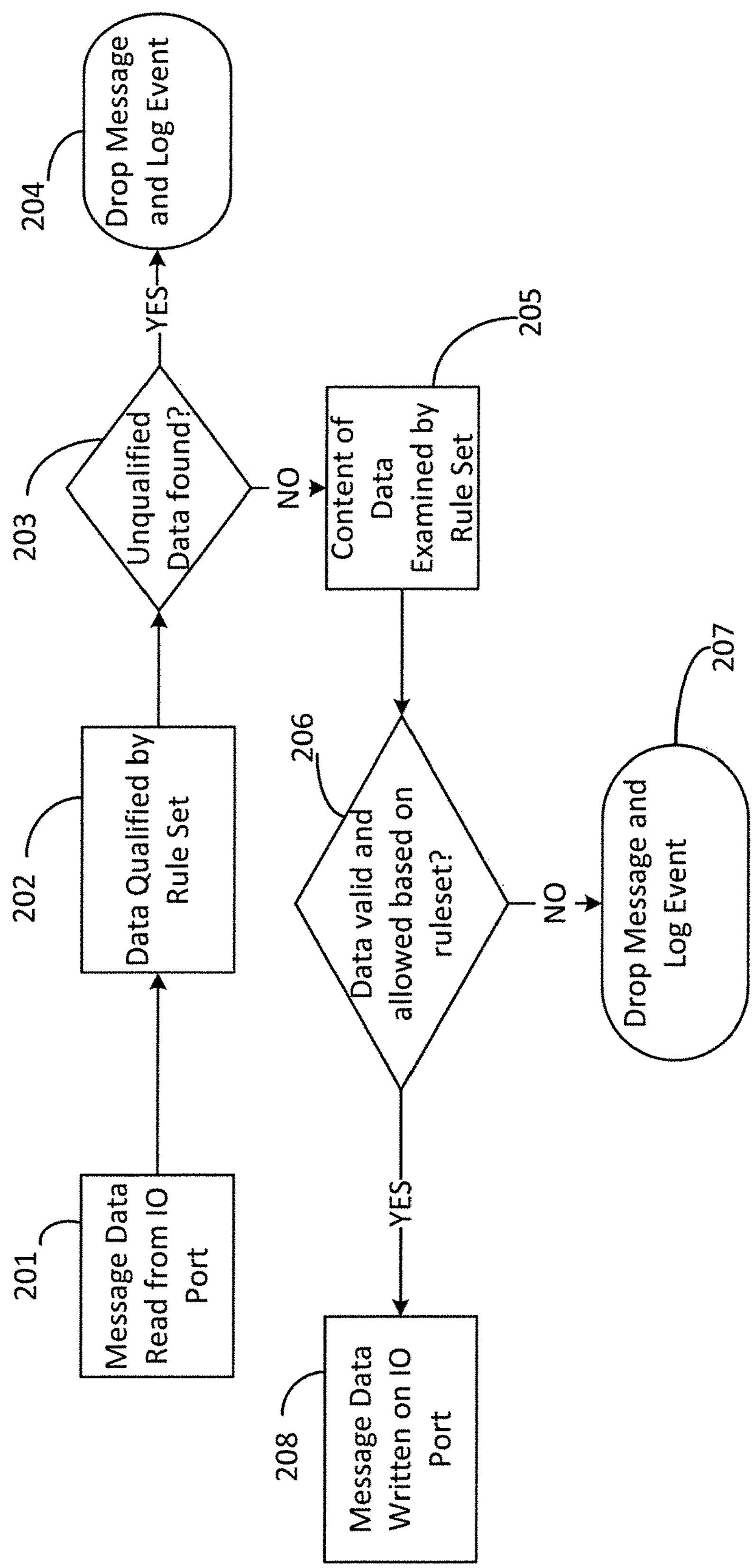
FIG. 5 is a flow chart representing the steps of validating data in accordance with one aspect of the present disclosure.

FIG. 5 is a data flow diagram for exemplary data validation software used in an embodiment of the cyber-security device 20. This embodiment is advantageous for processing standard messages that are not deterministic (i.e., not "time-critical"), as explained below, and that do not include state-based information. A data message is read (step 201) from a first input/output (I/O) port operationally associated with, for example, a non-real time communication interface 36 or a real-time interface 34 connected either to internal or external systems, depending on whether the data message is inbound or outbound relative to the safety-critical control device. After the data inputted to the I/O port are read, the data are qualified (step 202) (preferably byte-by-byte) by a rule-set, as described above, to determine the presence of malformed or unexpected data ("unqualified" data). If any unqualified data are found ("YES" in decision step 203), such data are deleted, and a log event occurs (step 204). If no such unqualified data are found ("NO" in decision step 203), the content of the qualified data is examined in accordance with the rule-set (step 205) to determine compliance with the validation criteria. If non-compliance is determined ("NO" in decision step 206), the data are deleted, and a log entry is created (step 207). If the data are found to be compliant with the validation criteria, i.e., the data are determined to be valid ("YES" in decision step 206), the data may optionally be modified (as needed) in accordance with any further criteria that may be established by the rule-set, then written (step 208) on a second I/O port operationally associated with the destination communication interface (of the interfaces 34, 36), and finally output from the I/O port to the appropriate communication interface.

An exemplary rule-set that may be used in some embodiments of this disclosure may be generically described as including the following logical processes operating on message data read from an I/O port:

In the first process, the message is qualified by reading the message header to determine and verify message characteristics such as, for example, the message type, and the expected message length, and the message version, to validate integrity of the message. This process includes (a) reading the Start of Message byte sequence where applicable; (b) reading N bytes (where N is the number of bytes defined in the rule-set for that message format), indicating the start of the message that comprises the header, if applicable; and (c) verifying that the header is valid, that there are no illegal values or extra characters in the message, and that all required fields are present and match requirements defined in the message protocol and the rule-set. In another aspect, ASCII messages such as XML may be processed—in a first process—by verifying delimiters or custom delimiters or message criteria to determine message validity as described above.

In an aspect, the first process also advantageously includes comparing the total size of the data read to the message packet size specified in the header or associated data headers as defined in the message schema to assure that no extra data have been inserted, that no required fields are missing, and that no potential data overflows are possible.

In the second process, the contents of the message payload data are looped through to assure that only allowed fields are present in the message and that they conform to limits defined in the rule-set. This process includes repeating a sequence of sub-steps through the entire contents of the message data payload or until an invalid data value or field is detected, or the total amount of data read matches or exceeds the expected message packet size. The sequence of sub-steps comprises: (1) reading M bytes that comprise a data field identifier; (2) reading the value and contents of the data field; (3) assuring that the data field is allowed by rule-set; and (4) if allowed, assure that the values of that data are within limits and ranges defined in the rule-set.

In the second process, for example, the message data may be processed to determine if the type of message is allowed and whether or not values or fields within the message are within allowed limits for that message, as defined by the rule-set. For example, in a particular application, the cyber-security device could be applied to protect a safety-critical control device for avionics. In an aspect, the avionics control device may allow various commands to control the operation of the aircraft's engines, control surfaces (e.g., flaps, rudder, elevators), and cabin environment. In such an application, a cyber-security device 20 may be programmed to review incoming messages and determine that they are properly formed, are of the right size, and the like. Furthermore, the actual contents of the messages may also be analyzed for compliance with a rule-set. For example, the cyber-security device 20 will ensure that no extra data are tacked onto the message that could be interpreted improperly by the avionics control device according to a first process. According to a second process, the cyber-security device 20 may also determine if message data values, such as function parameters, are within operating limits according to the rule-set. For example, in one rule-set, changes in engine speed might be required to occur in increments of between 100 and 300 rpm. In such a case, if an "increase engine speed" message is processed with a parameter indicating a change of 200 rpm, it is allowed as within the rule-set. On the other hand, if the "increase engine speed" message included a parameter indicating a change of 500 rpm, it may be dropped as seeking a change that is outside what are deemed safe limits of operation based on the system's rule-set.

The above-described generic rule-set—and the specific example—are exemplary only and are not limiting. Variations and modifications of a rule-set will readily suggest themselves for particular applications. Rule-sets may be based on any of a variety of message processing rules, including message type, message size, message contents, message source, message destination, message protocol, system time, data rate, system state, the data type and values of message contents, and the like. Moreover, rule-sets may allow for variance based on outside input apart from the message contents itself.

Figure 6:
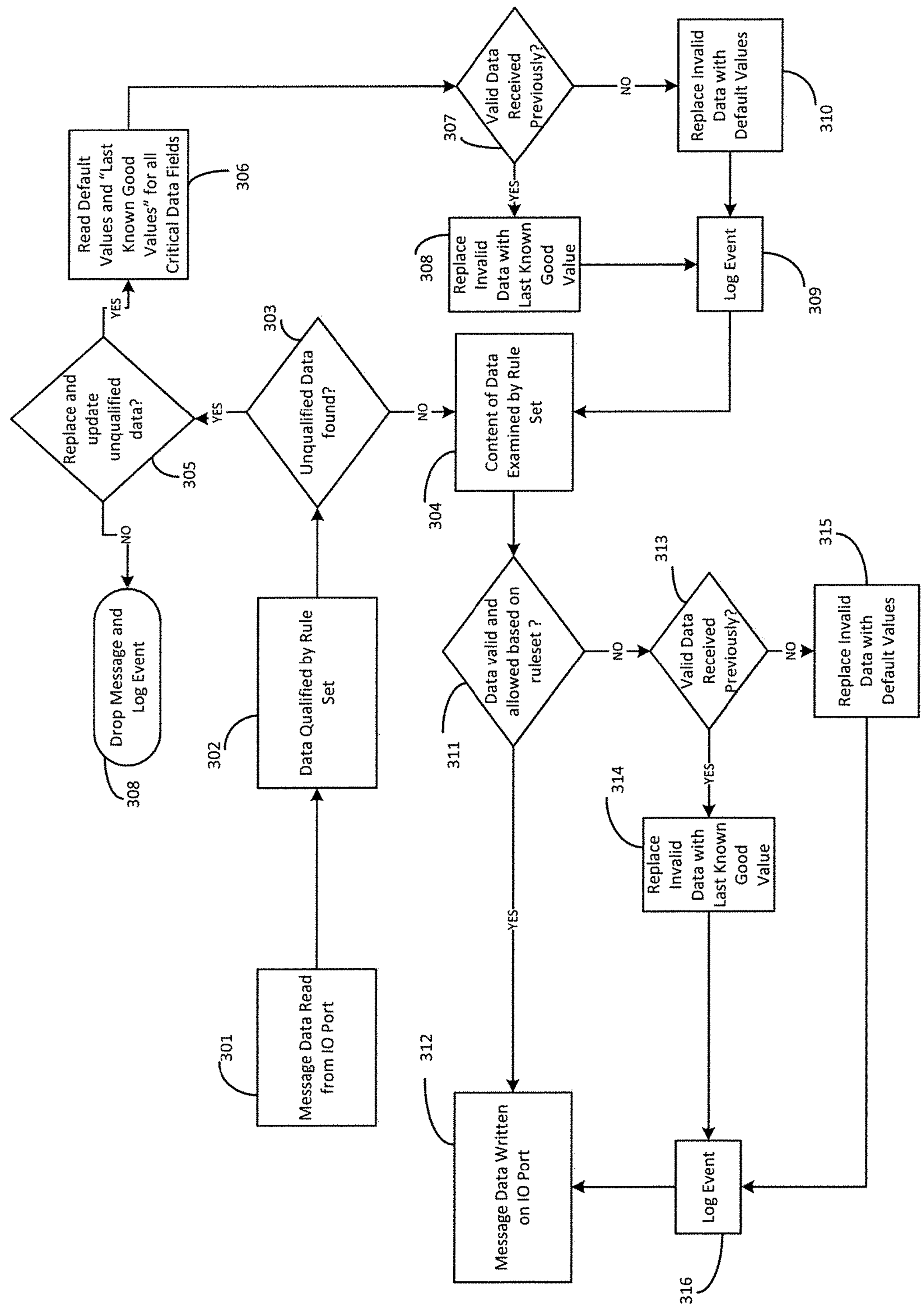
FIG. 6 is a flow chart representing the steps of validating data in time-critical and real-time messages in accordance with one aspect of the present disclosure.

Some control systems and interfaces require the management of synchronized or deterministic communications between the safety-critical control device and external systems/devices or secondary safety-critical control systems. Such systems, for example, may "expect" a timed sequence of messages at predetermined intervals, e.g., 10 msec or 20 msec. Such messages are commonly referred to as "deterministic" or "time-critical," and must be passed continuously in some form to assure proper system functionality. In other words, for such time-critical messages, blocking or dropping the message may result in errors or problems in the overall control system. Therefore, if the message, as initially formed, cannot be validated by the rule-set, it must be altered in a way that makes the message compliant with the rule-set (i.e., "sanitizes" the message), and then passing the sanitized message through to the recipient device or system. The alteration may be by way of redaction (deletion of the offending data), and (optionally) replacement of the deleted data with a predetermined default value, or (optionally) the last known compliant ("good") data value for that field. A flow chart of an exemplary algorithm for software to handle such time-critical messages is shown in FIG. 6.

As in the algorithm discussed above and shown in FIG. 5, a data message is read (step 301) from a first input/output (I/O) port operationally associated with either a non-real time communication interface 36 or a real-time interface 34 connected either to internal or external systems, depending on whether the data message is inbound or outbound relative to the safety-critical control device. After the data inputted to the I/O port are read, the data are qualified (step 302) (preferably byte-by-byte) by a rule-set, as described above, to determine the presence of malformed or unexpected data ("unqualified" data). If no such unqualified data are found ("NO" in a first decision step 303), the content of the qualified data is examined in accordance with the rule-set (step 304) to determine compliance with the validation criteria. If unqualified data are found ("YES" in the first decision step 303), another decision is then made, in a second decision step 305, whether to replace and update the unqualified data (YES), or to drop the message and log the event (NO). If the decision in the second decision step 305 is YES, default values and/or the last known good values for all critical data fields are read from memory (step 306) and input to a third decision step 307, which determines the presence of a last-known "good" message (i.e., a message with rule-set compliant data values). In some cases, it may be desired to block malformed or unqualified messages in a time-critical system, thereby resulting in the decision in the second decision step 305 being NO, in which case the message is deleted or dropped (step 308) and (optionally) the event is logged.

If a last known "good" value for the required fields is available from memory and/or the processing of previous messages ("YES" in the third decision step 307), it is used to replace the corresponding unqualified or invalid data value(s) in the message (step 308), and a log entry may advantageously be created (step 309). If a last-known "good" value is not available ("NO" in the third decision step 307), the invalid or unqualified data value is replaced by a default value retrieved from memory (step 310), and a log entry may advantageously be created (step 309). In some instances it may be advantageous for the system to use machine learning and heuristics that may combine or interpret previous data sets to assist in the process of data replacement and determination of "last know good" values. This could take into account multiple data sources to provide redundant solutions for data replacement, or utilize data fields that are common with other interfaces or protocols as replacement data. Thus, after either step 308 (replacement of unqualified data with a last-known "good" value) or step 310 (replacement with a default value), the message is now deemed "qualified." The qualified message content is now validated, preferably byte-by-byte, in accordance with the rule-set (step 304). If the data are found to be compliant with the validation criteria established by the rule-set, i.e., the data are determined to be valid ("YES" in a fourth decision step 311), the data may optionally be modified (as needed) in accordance with any further criteria that may be established by the rule-set, then written (step 312) on a second I/O port operationally associated with the destination communication interface, and finally output from the I/O port to the appropriate communication interface.

If, on the other hand, data in the message are found to be non-compliant with the validation criteria ("NO" in the fourth decision step 311), a fifth decision step 313 is implemented, in which it is determined whether valid data (i.e., compliant with the validation criteria) have been previously received. If "YES," the non-compliant (i.e., "invalid") data are replaced by the last known corresponding "good" or valid data values (step 314), and the message is written on the appropriate I/O port (step 312). A log entry may advantageously be created (step 316). If valid data have not previously received ("NO" in the fourth decision step 313), the invalid data are replaced by the corresponding default data values (step 315), and then written on the appropriate I/O port (step 312). A log entry may advantageously be created (step 316). As mentioned previously, in some instances it may be advantageous for the system to use machine learning and heuristics that may combine or interpret previous data sets to assist in the process of data replacement and determination of "last know good" values. This could take into account multiple data sources to provide redundant solutions for data replacement, or utilize data fields that are common with other interfaces or protocols as replacement data.

Figure 7:
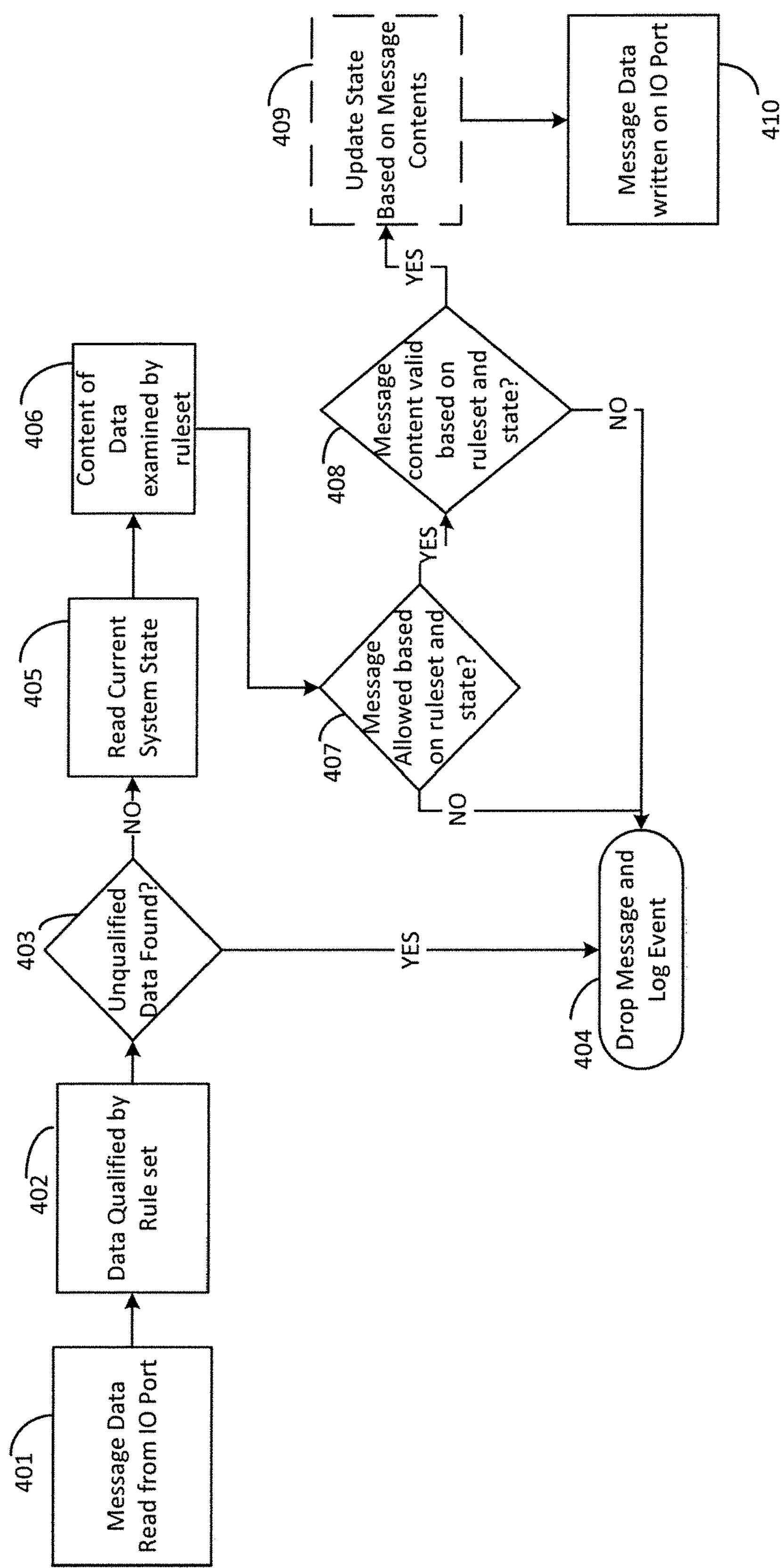
FIG. 7 is a flow chart representing the steps of validating data in accordance with another aspect of the present disclosure.

In an aspect, for example, the rule-set can further be programmed to take device state into account when processing messages. While this will often come from the state reported by the safety-critical control device 12, it can also take into account the states of multiple control devices 12, a control device state, external device/system states, internal device states, combinations or the same, and the like. FIG. 7 illustrates a sample data flow process that includes analyzing messages in light of system states.

As illustrated, in an aspect, a data message is read from an I/O port (step 401). This may comprise a message from an I/O port operationally associated with either a non-real time communication interface 36 or a real-time interface 34 connected either to internal or external systems, depending on whether the data message is inbound or outbound relative to the safety-critical control device. After the data message input to the I/O port is read, the data message is analyzed in a first process (step 402) (preferably byte-by-byte) by a rule-set, as described above, to determine the presence of malformed or unexpected data ("unqualified" data). If malformed or unqualified data are found ("YES" in a first decision step 403), the message is deleted, and a log event may be created (step 404). If no such malformed or unqualified data are found (i.e., the data are well-formed), the decision in step 403 is "No", and the process continues to step 405, in which system state data are read from memory 33 or storage 35 as needed. As described above, in an aspect, the state data are gleaned from a variety of sources, including previous messages, from the safety-critical control device 12 or other devices or sources, that are processed through or connect to the cyber-security device 20. In another aspect, the cyber-security device 20 may further be able to poll connected devices for state information, but this additional communication traffic may be less desirable or unnecessary. In yet another aspect, the cyber-security device may use machine learning analysis of historical messages, and data analysis and correlation to determine aspects of the system state using inputs.

The qualified data of the message content are then examined in accordance with the rule-set and in light of the system state data read from memory (step 406), and the process proceeds to a second decision step 407 to determine whether the message is allowed at that time. If the message is not allowed at that time ("NO" in the second decision step 407), the message and data are deleted, and a log entry may be created (step 404). If the message is allowed ("YES" in the second decision step 407), the content of the allowed message is examined in accordance with the rule-set and the current system state data (third decision step 408) to determine compliance with the validation criteria. If non-compliance is determined ("NO" in the third decision step 407), the message and data are deleted, and a log entry may be created (step 404). If the data are found to be compliant with the validation criteria in light of the system state data, i.e., the message data are determined to be valid ("YES" in the third decision step 408), the message data may optionally be used to update the system state data stored in the cyber-security device 20 (step 409). Then the message is written (step 410) to a second I/O port operationally associated with the destination interface among the interfaces 34, 36, and finally outputted from the I/O port to the destination interface. As mentioned previously, in some instances it may be advantageous for the system to use machine learning and that may combine or interpret previous data sets to assist in the process of data replacement and determination of "last know good" values. This could take into account multiple data sources to provide redundant solutions for data replacement or utilize data fields that are common with other interfaces or protocols as replacement data.

In a specific example, a safety-critical avionics control device in accordance with this disclosure that is controlling an aircraft engine speed may have, as a state, the current engine speed. In normal operation, for example, an external system may poll the avionics control device for the engine speed at periodic intervals. This will cause a message to be returned from the avionics control device that includes the current engine speed. As the cyber-security device processes this return message, it may make a copy of the current engine speed reading as a part of the current system state. The rule-set may then be set up to allow or deny messages based on the engine speed state variable. For example, a rule-set may include a rule that indicates "increase engine speed" or "decrease engine speed" messages are only acceptable when the current engine speed is outside of a normal range, such as between 5000 and 8000 rpm. When a proper "report engine speed" message is sent through the cyber-security device to the avionics control device, the cyber-security device passes along the request and receives the response message from the avionics control device. In an aspect, the cyber-security device may process the response message and save the current reading for engine speed that is being reported—for example, 7000 rpm. If the cyber-security device then receives an "increase engine speed" message, it can review the current engine speed state reading and deny the message.

In another example, in a particular application, the cyber-security device could be applied to protect a safety critical control device for avionics in a particular way only when the aircraft is airborne, and in a different way when the aircraft is on the ground. In such an application, the cyber security device may use the state of aircraft systems, for example, a sensor signal indicating the state of the aircraft (airborne, on the ground) based on weight on wheels or other sensors either connected to the safety-critical systems or directly to the cyber security device.

Figure 8:
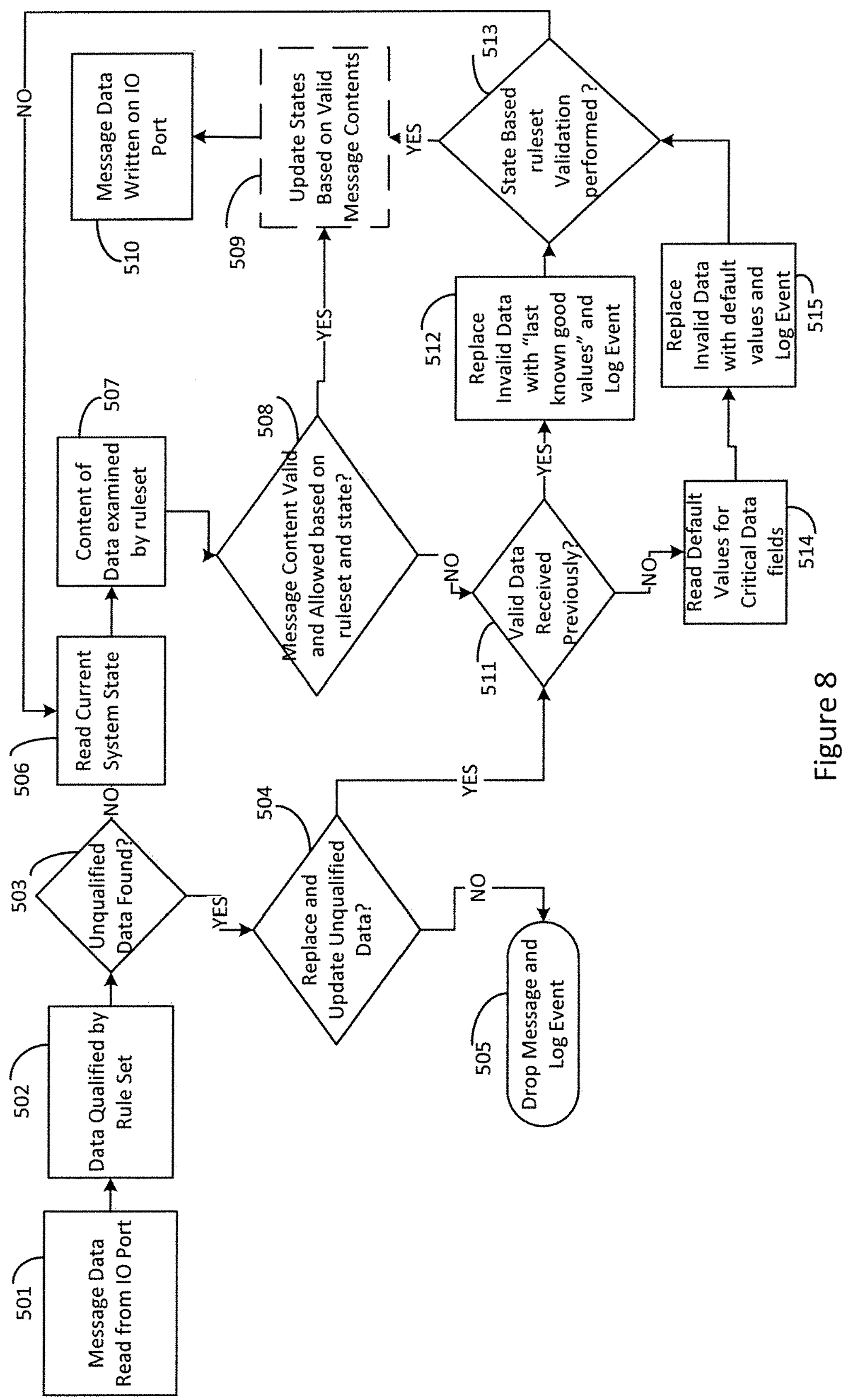
FIG. 8 is a flow chart representing the steps of validating data in time-critical and real-time messages in accordance with another aspect of the present disclosure.

The process described above with reference to FIG. 7 is best suited for data messages that are not time-critical. For data messages that are time-critical (as discussed above with reference to FIG. 6), the process illustrated in FIG. 8 is advantageously implemented.

As illustrated, in an aspect, a data message is read from an I/O port (step 501). This may comprise a message from an I/O port operationally associated with either a non-real time communication interface 36 or a real-time interface 34 connected either to internal or external systems, depending on whether the message is inbound or outbound relative to the safety-critical control device. After the data message input to the I/O port is read, the data message is analyzed in a first process (step 502) (preferably byte-by-byte) by a rule-set, as described above, to determine the presence of malformed or unexpected data ("unqualified" data). If malformed or unqualified data are found ("YES" in a first decision step 503), a decision is made, in a second decision step 504, whether to replace and/or update the unqualified data. If the decision in the second decision step 504 is "NO," the message is deleted, and a log event may be created (step 505). If the decision in the second decision step 504 is "YES," the process proceeds to a fourth decision step 511, described below.

If no unqualified data are found as a result of the analysis performed in the above-mentioned step 502 (i.e., the data are well-formed), a "NO" result is obtained in the first decision step 503, and the process continues to step 506, in which the current system state is read, as described above with reference to FIG. 7. The process then examines the data content of the message (preferably byte-by-byte) in accordance with the rule-set and in light of the current system state (step 507), from which the process advances to a third decision step

508. In the third decision step 508, the process determines whether the message content is valid (i.e., in compliance with the validation criteria established by the rule-set), and thus allowed at that time. If the message content is valid and thus allowed ("YES" in the third decision step 508), the system state data in the cyber-security device 20 may optionally be updated based on the valid message contents (step 509), and the message data are written on the appropriate I/O port (step 510).

If third decision step 508 produces a "NO" outcome, meaning the message content is not valid (not in compliance with the validation criteria) and thus not allowed, the process proceeds to the above-mentioned fourth decision step 511 which determines whether a message data with a last-known "good" value has previously been received. If a last known "good" value is available from memory ("YES" in the fourth decision step 511), it is used to replace the corresponding invalid data value(s) in the message (step 512), and a log entry may advantageously be made. The process then proceeds to a fifth decision step 513, where it is determined whether a system state validation has been performed by the rule-set. If it has been performed ("YES" in the fifth decision step 513), the system state data in the cyber-security device may optionally be updated based on the valid message contents (step 509), and the valid message data are written on the appropriate I/O port (step 510). If it has not been performed ("NO" in the fifth decision step 513), the system returns to step 506 to read the current system state value, and repeats the above-described process from that point.

If a last-known "good" value is not available ("NO" in the fourth decision step 511), an appropriate default value is read from memory or storage (step 514) and is used to replace the invalid data value (step 515), and a log entry may advantageously be created. The process then proceeds to the fifth decision step 513, in which a "YES" outcome allows the process to write the message data on the I/O port (step 510) (optionally after the system state data update step 509), and in which a "NO" outcome returns the process to step 506 to read the current system state value, as described above. Thus, after either step 512 (replacement of invalid data by a last-known "good" value) or step 515 (replacement with a default value), the corrected or sanitized message is now deemed "validated" in accordance with the rule-set. The message is then directed to the fifth decision step 513, the "YES" and "NO" outcomes of which are described above.

Any of a large number of systems, states, and rule-sets are contemplated herein, and the specific applications described herein are exemplary only. One will understand from the disclosure herein that the cyber-security devices and methods disclosed herein may be readily adapted for use in a variety of applications, situations, and systems other than avionics systems, e.g., industrial control systems, energy management and distribution systems, remote monitoring systems, transportation control systems, medical systems and the like. Other concrete examples include railroads, ships, manufacturing and processing facilities (e.g., refineries), power stations, oil pipelines, and building HVAC, alarm, fire and other safety systems.

From the foregoing description, it will be appreciated, in some aspects, that cyber-security devices in accordance with this disclosure would typically be designed so that they cannot be configured or otherwise modified by users over internal or external interfaces without physical access to the device (due to needing access to the programming switch 46). Therefore, in accordance with such aspects, the security provided by the disclosed cyber-security devices cannot be overridden or by-passed, even if other protections are compromised. In other aspects, the cyber-security devices in accordance with this disclosure could be programmed and managed over either a remote or a local interface. In still another aspect, the cyber-security device can be operated in a learning mode and thus fielded to automatically build and modify a rule-set through processing all traffic in the system along with other inputs and using message analysis, heuristics, and other algorithms, such as machine learning. In the learning mode, the device can be updated continuously and automatically without the need for a programming mode or any external interface, or it may be combined with other modes of operation and authentication, if required. Furthermore, the learning mode can be implemented completely in non-volatile memory and with no permanent record, so that the security device can be fielded in a manner that it will not store any critical or secure information about the system it is protecting.

Significantly, cyber-security devices in accordance with aspects of this disclosure can provide bi-directional protection across all seven OSI model layers in an aspect. This is achieved through the use of segregated communication interfaces providing physical and data-link layer protection between each safety-critical control device and the other safety-critical control systems or external systems and networks. Furthermore, the cyber-security devices disclosed herein may advantageously protect the network and transport OSI model layers on any network or data bus. For instance, with Ethernet traffic, the cyber-security device protects these layers by limiting network data traffic to only the configured IP addresses and ports to and from each individual safety-critical control device. In addition, the cyber-security devices advantageously protect the session, presentation, and application OSI model layers through data validation and rule-sets that define what data can be sent to and from each safety-critical control based at least in part on the data content of communication traffic. Additionally, these layers can also be protected through encryption, which is supported in at least some aspects. Finally, the re-programmable feature described above allows the cyber-security devices disclosed herein to support custom rule-sets and configurations to tailor them to a wide variety of control devices and systems.

Although the present disclosure has been described with reference to specific aspects, these aspects are illustrative only and not limiting. For example, although the description above has been described with respect to a discrete cyber-security device, the cyber-security functions and methods disclosed herein may be built into an existing safety-critical control device or system. Many other applications and aspects of the present disclosure will be apparent in light of this disclosure and the following claims. References throughout this specification to "one aspect" or "an aspect" means that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the disclosure, as will be recognized by those of ordinary skill in the art.

What is claimed is:

1. A cyber-security device for providing secure communication of data in a system including a control device, wherein the system is operable in one or more system states, the cyber-security device comprising:

a first communication interface configured for accepting incoming messages destined for the control device;

a second communication interface configured for accepting outgoing messages from the control device;

a memory configured to store current system state information and a rule-set comprising rules for qualifying and validating the incoming and the outgoing messages, wherein the rule-set includes a system state-dependent rule;

a processor operatively coupled to the memory and to the first communication interface and the second communication interface, and configured to qualify and validate the incoming messages and the outgoing messages on a byte-by-byte basis;

wherein the processor is operable in an operational mode to:

accept messages received from one of the first communication interface and the second communication interface;

retrieve the rule-set from the memory;

qualify the received messages, including any received messages containing received system state information, on a byte-by-byte basis, based on compliance with the rule-set;

for any received message that has been qualified, validate the qualified received message, on a byte-by-byte basis, in accordance with the rule-set, wherein the qualified received message is validated by compliance with the system state-dependent rule in the rule-set based on the current system state information;

transmit the received messages to the other of the first communication interface and the second communication interface only if the received message is validated in compliance with the rule-set; and update the current system state information based on the system state information in any validated message that includes received system state information.

2. The cyber-security device of claim 1, wherein the processor is operable in a programming mode in which the processor is operable to replace the rule-set in the memory with a new rule-set, and to cycle back to the operational mode after the new rule set is loaded from the memory.

3. The cyber-security device of claim 1, wherein the processor is further operable to block the received message when the received message cannot be validated.

4. The cyber-security device of claim 1, wherein, when the received message cannot be validated, the processor is further operable to replace data in the received message that are not in compliance with the rule-set with data known to be in compliance with the rule-set, whereby the received message with the data known to be compliant with the rule-set is deemed validated.

5. The cyber-security device of claim 4, wherein the data known to be in compliance with the rule-set are selected from one or more of data with default values, and data with last-known compliant values.

6. The cyber-security device of claim 5, wherein the data with last-known compliant values are determined from at least one previously-validated message.

7. The cyber-security device of claim 5, wherein the data with the last known compliant values are determined from an external data source.

8. The cyber-security device of claim 1, wherein the received system state information comes from at least one of the control device, an external system, and a secondary control device.

9. The cyber-security device of claim 1, wherein the processor is further operable in a learning mode in which the processor is operable to build or update rule-sets based on contents of received messages.

10. The cyber-security device of claim 1, wherein the processor is further operable for cross-domain processing of received messages across two or more security domain classifications.

11. A method of providing secure communication of messages to and from a control device in a system operable in any of several system states, wherein a current system state of the system is indicated by a current system state indication, the method comprising:

accepting incoming messages, bound for the control device, at a first communication interface that is in data communication with a processor operable to process messages with a rule-set that includes rules for qualifying the accepted incoming messages for message size and message type, and for validating message contents in the qualified incoming messages;

processing each accepted incoming message bound for the control device by operating the processor to implement the rule-set so as to qualify and validate, on a byte-by-byte basis, each accepted incoming message bound for the control device in accordance with the rule-set for message type, message size, message contents, and for compliance with a system state-dependent rule in the rule-set, based on the current system state indication;

sending only the incoming messages that are qualified and validated based on the rule-set to a second communication interface that is in data communication with the processor for transmission to the control device;

accepting outgoing messages from the control device at the second communication interface;

processing each accepted outgoing message from the control device by operating the processor to implement the rule-set so as to qualify and validate, on a byte-by-byte basis, each accepted outgoing message from the control device in accordance with the rule-set for message type, message size, message contents, and, for compliance with a system state-dependent rule in the rule-set, based on the current system state indication;

sending only the outgoing messages that are qualified and validated based on the rule-set to the first communication interface; and updating the current system state indication based on any system state information included in any validated message.

12. The method of claim 11, further comprising blocking incoming messages and outgoing messages that cannot be qualified and validated in accordance with the rule-set.

13. The method of claim 11, further comprising sanitizing incoming messages and outgoing messages that cannot be qualified and validated in accordance with the programmable rule-set by replacing data that are non-compliant with the rule-set with data known to be compliant with the rule-set.

14. The method of claim 11, wherein the rule-set is a first rule-set, the method further comprising:

putting the processor into a programming mode in response to a mode-selection signal;

receiving a second rule-set while the processor is in the programming mode;

replacing the first rule-set with the second rule-set;

exiting the programming mode; and processing future incoming messages and outgoing messages based on the second rule-set by operating the processor to implement the second rule-set so as to qualify and validate, on a byte-by-byte basis, each accepted incoming message and outgoing message in accordance with the second rule-set.

15. The method of claim 13, wherein the data known to be compliant with the rule-set are selected from one or more of data with default values, and data with last-known compliant values.

16. The method of claim 15, wherein the data with last-known compliant values are determined from at least one previously-validated message.

17. The method of claim 11, wherein the validation provided by the rule-set is dependent on the current system state indication.

18. A non-transitory computer-readable medium for use in a system operable in any of several system states, each of which is indicated by a current system state indication, the non-transitory computer-readable medium including instructions that, when executed by a processor in the system, cause the processor to:

accept incoming messages, bound for a control device, at a first communication interface in data communication with the processor, when the processor has been programmed with a rule-set that includes rules for qualifying and validating the accepted incoming messages for message size and message type, and for validating message contents in the accepted incoming messages wherein the rule-set includes a system state-dependent rule;

process each accepted incoming message by operating the processor to implement the rule-set so as to qualify and validate, on a byte-by-byte basis, each accepted incoming message in accordance with the rule-set, wherein each accepted incoming message is further validated by the system state dependent rule in the rule-set, based on the current system state indication;

send only the incoming messages that are qualified and validated based on the rule-set to a second communication interface that is in data communication with the processor for transmission to the control device;

accept outgoing messages from the control device at a second communication interface in data communication with the processor;

process each accepted outgoing message from the control device by operating the processor to implement the rule-set so as to qualify and validate, on a byte-by-byte basis, each accepted outgoing message in accordance with the rule-set, is further validated by the system state dependent rule in the rule-set, based on the current system state indication;

send only the outgoing messages that are qualified and validated based on the rule-set to the first communication interface; and update the current system state indication based on any system state information in any validated message.

19. The non-transitory computer-readable medium of claim 18, wherein the instructions further cause the processor to block incoming messages and outgoing messages that cannot be qualified and validated in accordance with the rule-set.

20. The non-transitory computer-readable medium of claim 18, wherein the instructions further cause the processor to sanitize incoming messages and outgoing messages that cannot be qualified and validated in accordance with the rule-set by replacing data that are non-compliant with the rule-set with data known to be compliant with the rule-set.

21. The non-transitory computer-readable medium of claim 18, wherein the rule-set is a first rule-set, the non-transitory computer-readable medium further comprising instructions to:

put the processor into a programming mode in response to a mode-selection signal;

accept a second rule-set including a system-state-dependent rule only while the processor is in the programming mode;

replace the first rule-set with the second rule-set;

exit the programming mode; and process future incoming messages and outgoing messages based on the second rule-set by operating the processor to implement the second rule-set so as to qualify and validate, on a byte-by-byte basis, each accepted incoming message and outgoing message in accordance with the second rule-set.

22. The non-transitory computer-readable medium of claim 20, wherein the data known to be in compliance with the rule-set are selected from one or more of data with default values, and data with last-known compliant values.

23. The non-transitory computer-readable medium of claim 22, wherein the data with last-known compliant values are determined from at least one previously-validated message.

24. A cyber-security device for providing secure data communication to and from a control device in a control system operable in more than one system state, the cyber-security device comprising:

a first communication interface configured for data communication with the control device;

a second communication interface configured for data communication with a system, a network, or a device other than the control device;

a memory configured to store an indication of a current system state of the control system and a processor-implementable rule-set defining qualification criteria and validation criteria for data contents of incoming messages to the control device and data contents of outgoing messages from the control device; and a processor in communication with the first communication interface, the second communication interface, and the memory;

wherein the processor is operable in an operational mode to:

accept incoming data messages into the processor;

determine the indication of the current system state of the control system from the memory;

qualify, on a byte-by-byte basis, the content of each incoming data message by compliance with the data qualification criteria defined by the processor-implementable rule-set;

validate, on a byte-by-byte basis, the content of each qualified incoming data message by compliance with the data validation criteria defined by the processor-implementable rule-set, and by compliance with a system state-dependent rule in the rule-set based on the current system state;

output from the processor to the first communication interface only those incoming data messages the content of which has been qualified and validated;

accept outgoing data messages into the processor;

qualify, on a byte-by-byte basis, the content of each outgoing data message by compliance with the data qualification criteria defined by the processor-implementable rule-set;

validate, on a byte-by-byte basis, the content of each qualified outgoing data message by compliance with the data validation criteria defined by the processor-implementable rule-set, and by compliance with the system state-dependent rule in the rule-set based on the current system state;

output from the processor to the second communication interface only those outgoing data messages the content of which has been qualified and validated; and update the current system state based on any system state information in any validated data message.

25. The cyber-security device of claim 24, wherein the processor is operable in a programming mode to load a new rule set and to cycle back to the operational mode after the new rule set is loaded.

26. The cyber security device of claim 24, wherein the processor-implementable rule set includes a first rule set configured to process the incoming data messages and a second rule set configured to process the outgoing data messages.

27. The cyber-security device of claim 24, wherein the memory is configured for storing system state information derived from any qualified and validated incoming data message that includes system state information, and from any qualified and validated outgoing data message that includes system state information.

28. The cyber-security device of claim 24, wherein the processor is configured to store in the memory the updated current system state based on the system state information received from at least one of the qualified and validated incoming data messages and outgoing data messages that includes system state information.

29. The cyber-security device of claim 24, wherein the processor is further operable to block any data message that cannot be validated.

30. The cyber-security device of claim 24, wherein, in any data message that cannot be validated, the processor is further operable to replace data that are not in compliance with the rule-set with data known to be in compliance with the rule-set, whereby the data message with the data known to be compliant with the rule-set is deemed validated.

31. The cyber-security device of claim 30, wherein the data known to be in compliance with the rule-set are selected from one or more of data with default values, and data with last-known compliant values.

32. The cyber-security device of claim 31, wherein the data with last-known compliant values are determined from at least one previously-validated message.

33. A method for providing secure communication of incoming data messages sent to a control device and outgoing data messages sent from a control device in a system operable in more than one system state, the method comprising:

determining a current system state of the system;

providing a processor programmed with a processor-implementable rule-set configured for qualification and validation of the content of the incoming and outgoing data messages, the rule-set defining data qualification and validation criteria;

accepting incoming data messages into the processor;

qualifying, on a byte-by-byte basis, the content of each incoming data message by compliance with the data qualification criteria defined by the rule-set;

validating, on a byte-by-byte basis, the content of each qualified incoming data message by compliance with the data validation criteria defined by the rule-set, and by compliance with a system state-dependent rule in the rule-set based on the current system state;

outputting from the processor only those incoming data messages the content of which has been qualified and validated;

accepting outgoing data messages into the processor;

qualifying, on a byte-by-byte basis, the content of each outgoing data message by compliance with the data qualification criteria defined by the rule-set;

validating, on a byte-by-byte basis, the content of each qualified outgoing data message by compliance with the data validation criteria defined by the rule-set, and by compliance with the system state-dependent rule in the rule-set based on the current system state;

outputting from the processor only those outgoing data messages the content of which has been qualified and validated; and updating the current system state of the system based on any system state information in any validated data message.

34. The method of claim 33, wherein the rule-set includes a first rule-set configured to process the incoming data messages, and a second rule-set configured to process the outgoing data messages.

35. The method of claim 33, wherein the processor has an operational mode and a programming mode, and wherein the rule-set is implemented only when the processor is in the operational mode.

36. The method of claim 35, further comprising re-programming the processor with a new processor-implementable rule-set when the processor is in the programming mode.

37. The method of claim 36, wherein the re-programming is performed by:

switching the processor from the operational mode to the programming mode;

loading the new processor-implementable rule-set into the processor; and cycling the processor back to the operational mode.

38. The method of claim 37, wherein the loading of the new processor-implementable rule-set is performed via a communication interface.

39. The method of claim 33, wherein the qualification of the content of the incoming data messages and the outgoing data messages comprises:

determining the presence, in each data message, of unqualified content that is not in compliance with the data qualification criteria defined by the rule-set; and deleting any unqualified content determined to be present.

40. The method of claim 39, wherein the validation of the content of the incoming data messages and the outgoing data messages comprises:

examining, in accordance with the data validation criteria defined by the rule-set, the qualified content of the data messages that has not been deleted, to determine compliance of the qualified content with the data validation criteria defined by the rule-set; and deleting any content determined to be non-compliant with the data validation criteria defined by the rule-set.

41. The method of claim 40, wherein the validation further comprises replacing the deleted content with content known to be compliant with the data validation criteria defined by the rule-set.

42. The method of claim 40, wherein the validation further comprises, after examining the qualified content of the data messages, modifying at least some of the qualified content that has not been deleted so as to be compliant with further data validation criteria defined by the rule-set.

43. A control system that is operable in one or more system states and that includes a cyber-security functionality, the automation and control system comprising:

a control device;

a processor in data communication with the control device and a network, control system or device other than the control device;

a memory operatively associated with the processor and configured to store an indication of a current system state and a rule-set defining qualification and validation criteria for data contents of incoming data messages directed to the control device, and data contents of outgoing data messages directed from the control device;

wherein the processor is operable in an operational mode to process the incoming data messages and the outgoing data messages in accordance with the rule-set so as to (a) qualify, byte-by-byte, (i) the content of each of the incoming data messages as conforming to qualification criteria defined by the rule-set, and (ii) the content of each of the outgoing data messages as conforming to qualification criteria defined by the rule-set; (b) validate, byte-by-byte, the content of each qualified data message in accordance with validation criteria defined by the rule-set, and by compliance with a system state-dependent rule in the rule-set; (c) pass to or from the control device only data content (i) that has been qualified and validated, and (ii) that is deemed proper based on the indication of the current system state and the compliance of the qualified data message with the system state-dependent rule in the rule-set; and (d) update the indication of current system state based on any system state information contained in any qualified and validated data message.

44. The system of claim 43, wherein the processor is operable in a programming mode in which the processor may be re-programmed with a new rule-set, wherein the processor is configured to cycle back to the operational mode after the processor is re-programmed with the new rule-set.

45. The system of claim 43, wherein the rule-set includes a first rule-set configured to process the incoming data messages, and a second rule-set configured to process the outgoing data messages.

46. The system of claim 43, wherein the processor is further operable to block a message that cannot be validated.

47. The system of claim 43, wherein the processor is further operable to replace data in a message that are not in compliance with the rule-set with data known to be in compliance with the rule-set, whereby the message with the data known to be compliant with the rule-set is deemed validated.

48. The system of claim 47, wherein the data known to be in compliance with the rule-set are selected from one or more of data with default values, and data with last-known compliant values.

49. The system of claim 48, wherein the data with last-known compliant values are determined from at least one previously-validated message.

50. The system of claim 43, wherein the processor is further operable to build or update rule-sets based on contents of qualified and validated messages.

51. The method of claim 11, wherein the system state information included in any validated message comes from at least one of the control device, an external system, and a secondary control device.

52. The method of claim 11, further comprising updating the rule-set based on contents of a validated message.

53. The non-transitory, computer-readable medium of claim 18, wherein the instructions, when executed by the processor, cause the processor to build or update a rule-set based on contents of a validated message.

54. The non-transitory, computer-readable medium of claim 18, wherein system state information included in any validated message comes from at least one of the control device, an external system, and a secondary control device.

55. The cyber-security device of claim 24, wherein the processor is further operable to build or update a rule-set based on contents of a validated message.

56. The cyber-security device of claim 24, wherein system state information included in any validated message comes from at least one of the control device, an external system, and a secondary control device.

57. The method of claim 33, wherein the processor is further operable to build or update a rule-set based on contents of a validated message.

58. The method of claim 33, wherein system state information included in any validated message comes from at least one of the control device, an external system, and a secondary control device.

59. The system of claim 43, wherein the system state information comes from at least one of the control device, an external system, and a secondary control device.

* * * * *